W. W. WHITE.
GATE CONTROLLING MECHANISM FOR WATER WHEELS.
APPLICATION FILED FEB. 15, 1907.

955,569.

Patented Apr. 19, 1910.

Witnesses
Roy D. Tolman
Penelope Comberbach

Inventor
William W. White.
By Rufus B. Fowler
Attorney

UNITED STATES PATENT OFFICE.

WILLIAM W. WHITE, OF WORCESTER, MASSACHUSETTS, ASSIGNOR TO HOLYOKE MACHINE COMPANY, OF WORCESTER, MASSACHUSETTS, A CORPORATION OF MASSACHUSETTS.

GATE-CONTROLLING MECHANISM FOR WATER-WHEELS.

955,569.  Specification of Letters Patent.  Patented Apr. 19, 1910.

Application filed February 15, 1907. Serial No. 357,561.

*To all whom it may concern:*

Be it known that I, WILLIAM W. WHITE, a citizen of the United States, residing at Worcester, in the county of Worcester and Commonwealth of Massachusetts, have invented certain new and useful Improvements in Gate-Controlling Mechanism for Water-Wheels, of which the following is a specification, accompanied by drawings forming a part of the same, in which—

Figure 1:
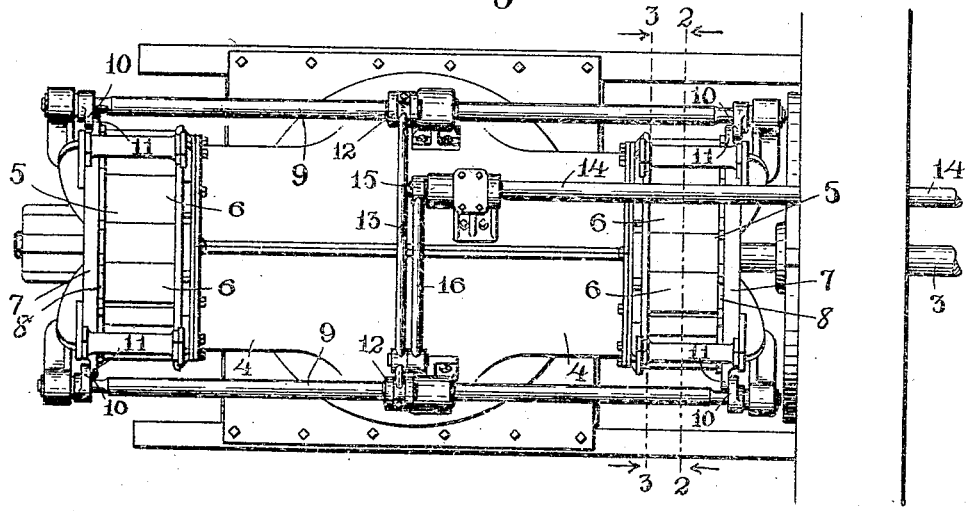
Figure 2:
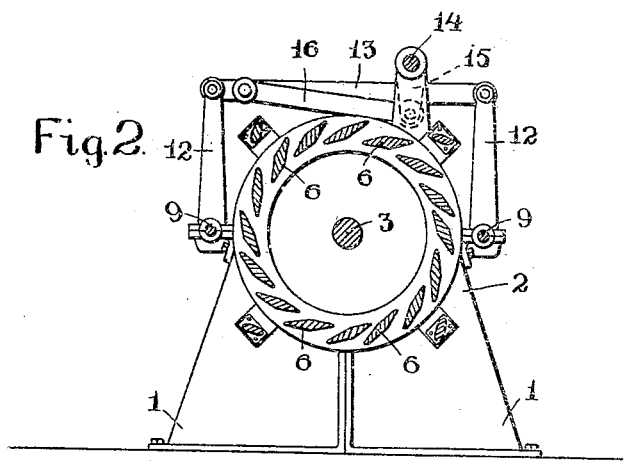
Figure 3:

Figure 1 is a top view of a pair of water wheels embodying my invention. Fig. 2 is a sectional view on line 2—2, Fig. 1, looking in the direction of the arrow, and Fig. 3 is a sectional view on line 3—3, Fig. 1, looking in the opposite direction.

Similar reference figures refer to similar parts in the different views.

My invention relates to improved connecting mechanism between the gate of a water wheel and a governor by which the gates of a pair of water wheels may be operated with increased ease and accuracy under the influence of the governor, and it consists in the construction and arrangement of parts as hereinafter described and pointed out in the annexed claims.

Referring to the accompanying drawings 1 denotes a base and 2 a framework which supports water wheels, not shown, mounted on a shaft 3 and surrounded by cases 4. Inside of each case 4 and surrounding the water wheel is a gate 5 consisting of pivoted blades 6. These blades 6 are rocked by rotatable rings 7 connected with one end of the blades 6 by links 8 thereby controlling the admission of water into the surrounding case 4 and hence to the water wheel. From the water wheel the water passes off through a central discharge in the usual manner.

The above is the ordinary practice of constructing a water wheel and gate and will be well understood by those conversant with this class of mechanisms.

The rotatable rings 7 in both cases 4 are operated by gate controlling shafts 9 to which are attached arms 10 engaging projecting lugs 11 on opposite sides of the rings 7. Midway between the arms 10 are radial arms 12 attached to the shafts 9 with their ends connected by a link 13. Journaled in the framework is a governor shaft 14 which is connected with a governor, not shown, and receives an oscillatory movement from it according to the speed of the water wheels in the usual manner.

Attached to the end of the governor shaft 14 is a crank arm 15 which is connected by a link 16 with the link 13 uniting the arms 12 on the gate controlling shafts 9. As the governor shaft 14 is oscillated under the influence of the governor the gate controlling shafts 9 will be rocked in opposite directions by the arms 12, link 13, link 16 and arm 15. The rocking motion of the gate controlling shafts 9 will rotate the rings 7 through the arms 10 and lugs 11, thereby opening or closing the gate blades 6 and shutting off or admitting water to the water wheel.

By applying the power to rock the gate controlling shafts 9 midway their length, I insure that the power applied will be equally distributed to the arms 10 to open or close the gates of both water wheels simultaneously and that any loss of motion due to the torsion of the gate controlling shafts 9 will also be equal at both gates, producing a uniform opening or closing of both gates. I also dispense with all gearing and apply the power necessary to operate the gates to the gate shafts 9 at the most advantageous point and by means of pivotal connections with the governor shaft.

I claim,

1. A gate controlling mechanism for simultaneously operating gates at both ends of a water wheel case, comprising a rocking gate shaft operatively connected with both of said gates, and a governor shaft arranged to rock said gate shaft at a point between said gates.

2. A gate controlling mechanism for simultaneously operating gates at both ends of a water wheel case, comprising a rocking gate shaft operatively connected with both of said gates, and a governor shaft arranged to rock said gate shaft at a point an equal distance from said gates.

3. A gate controlling mechanism for simultaneously operating gates at both ends of a water wheel case, comprising a rocking gate shaft, a rocking governor shaft, means for operating said gate shaft from said governor shaft, said means located at a point between said gates and comprising a crank arm attached to said governor shaft and links connecting said crank arm and said gate shaft.

4. A gate controlling mechanism for a water wheel gate comprising a gate controlling shaft on each side of the water wheel operatively connected with said gate, radial arms attached to said shafts, a link connecting said radial arms, a governor shaft and a crank arm on said governor shaft operatively connected with said link.

Dated this 12th day of February 1907.

WILLIAM W. WHITE.

Witnesses:
    PENELOPE COMBERBACH,
    RUFUS B. FOWLER.